(12) United States Patent
Mose et al.

(10) Patent No.: US 7,366,146 B2
(45) Date of Patent: Apr. 29, 2008

(54) DATA COMMUNICATION SYSTEM AND METHOD AND SERVER

(75) Inventors: Kazuhiro Mose, Tokyo (JP); Masayuki Yamada, Tokyo (JP); Kazuhiro Azuma, Tokyo (JP); Toshikazu Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 968 days.

(21) Appl. No.: 10/389,940

(22) Filed: Mar. 18, 2003

(65) Prior Publication Data

US 2003/0227909 A1 Dec. 11, 2003

(30) Foreign Application Priority Data

Mar. 18, 2002 (JP) ............................ 2002-074175

(51) Int. Cl.
*H04Q 7/24* (2006.01)

(52) U.S. Cl. ..................................... 370/338
(58) Field of Classification Search ..................... None
See application file for complete search history.

(56) References Cited

U.S. PATENT DOCUMENTS

| | | | | |
|---|---|---|---|---|
| 5,546,382 A * | 8/1996 | Fujino | ........................ | 370/352 |
| 6,169,909 B1 * | 1/2001 | Koshino | ..................... | 455/557 |
| 6,330,434 B1 * | 12/2001 | Nitta | ........................... | 455/403 |
| 6,519,266 B1 * | 2/2003 | Manning et al. | ............ | 370/469 |
| 6,781,979 B1 * | 8/2004 | Ebata et al. | ................. | 370/338 |
| 6,873,602 B1 * | 3/2005 | Ambe | ......................... | 370/401 |
| 7,079,519 B2 * | 7/2006 | Lee et al. | .................... | 370/338 |
| 7,103,028 B1 * | 9/2006 | Yasue et al. | ................. | 370/338 |
| 2004/0028036 A1 * | 2/2004 | Mose et al. | ................. | 370/353 |
| 2004/0174866 A1 * | 9/2004 | Matsuda et al. | ............ | 370/352 |

FOREIGN PATENT DOCUMENTS

JP 2002-010341 * 1/2002

* cited by examiner

*Primary Examiner*—Huy D. Vu
*Assistant Examiner*—Phuongchau B Nguyen
(74) *Attorney, Agent, or Firm*—Young & Thompson

(57) ABSTRACT

A data communication system includes a server, data link started side apparatus, data link starting side apparatus, and originating server. The server provides a service through a network. The data link started side apparatus performs line control between itself and the line connection destination, and performs LAN control between itself and the server through the network, thereby relaying packets between the line connection destination and the server. The data link starting side apparatus is connected to the data link started side apparatus, disconnects the line between itself and the data link started side apparatus on the basis of an MITF dial-up dormant protocol when there is no communication between itself and the server for a predetermined period of time, and shifts to a dormant state. The originating server originates data reception notification by using the originating telephone number transmitted from the data link started side apparatus when a packet communication state between the data link starting side apparatus and the data link started side apparatus is in the dormant state, and the data link started side apparatus receives data addressed to the data link starting side apparatus from the server. A data communication method and a server are also disclosed.

11 Claims, 5 Drawing Sheets

DATA COMMUNICATION SYSTEM AND METHOD AND SERVER

BACKGROUND OF THE INVENTION

The present invention relates to a data communication system and method and a server which perform data communication by using the MITF (Mobile Internet Access Forum) dial-up dormant protocol which is a procedure for controlling connection by activating/inactivating data using the Internet.

In ARIB (Association of Radio Industries and Businesses) STD-T78 as a standard specification established by the ARIB, the specification of the MITF dial-up dormant protocol is defined, which is a procedure for controlling connection by using a transmission control function such as PIAFS (PHS Internet Access Forum Standard) and ISDN (Integrated Service digital Network) and activating/inactivating data using the Internet.

FIG. 3 shows a communication environment to which the MITF dial-up dormant protocol written in ARIB STD-T78 is applied. As shown in FIG. 3, in a data link starting side 1 and data link started side 2 connected to each other through a physical line, the dormant procedure of the MITF dial-up dormant protocol is located between a high-level protocol and a transmission control procedure as an upper layer relative to a physical layer. In this case, the physical layer is a layer for converting an output signaling system into a form matching the physical line, and the high-level protocol is a protocol dependent on an application program for facsimile communication, PC communication, Internet communication, or the like.

The MITF dial-up dormant procedure is constituted by a procedure on the data link starting side 1 which generates a dormant request and a procedure on the data link started side 2 which receives the dormant request and returns a response. The MITF dial-up dormant protocol provides the high-level protocol with a temporary disconnection function and reconnection function. More specifically, the MITF dial-up dormant protocol provides the high-level protocol with services of encapsulation of data link disconnection (transition to the dormant state) and data link reconnection (return from the dormant state, which is provided from the data link starting side only). The dormant state is a state wherein the link at the physical layer level between the data link starting side 1 and the data link started side 2 is released.

FIG. 4 shows a data communication system to which the MITF dial-up dormant protocol is applied. This data communication system is a system for accessing the Internet from a user terminal used by a user. As shown in FIG. 4, the system is comprised of a data link starting side apparatus 1 serving as a user terminal, a data link started side apparatus 2, Internet 6, a user connection destination server 4 located on the Internet 6, and a circuit switched network 5.

The data link starting side apparatus 1 is a personal computer (to be referred to as a PC hereinafter) or the like. A dormant function based on the MITF dial-up dormant protocol is installed in the data link starting side apparatus 1. The data link starting side apparatus 1 connects to the circuit switched network 5 to perform line control, and makes a data link connection to the data link started side apparatus 2.

The data link started side apparatus 2 performs line control between itself and the data link starting side apparatus 1 by connecting to the circuit switched network 5, and performs LAN control between itself and the user connection destination server 4 through the Internet 6, thereby relaying packets between the circuit switched network 5 and the Internet 6. The data link started side apparatus 2 has a function of holding the originating telephone number of the data link starting side apparatus 1 as internal information and restoring a connection to the previously used user connection destination server 4 at the time of reconnection from the data link starting side apparatus 1. The user connection destination server 4 is a server for providing users with Web and chat, which are generally used on the Internet 6, by connecting to the Internet 6 so as to perform LAN control and data communication.

FIG. 5 shows the dormant function of the data communication system to which the MITF dial-up dormant protocol is applied. As shown in FIG. 5, when the data link starting side apparatus 1 line-connects to the data link started side apparatus 2 by an originating/terminating function (step S101), the originating telephone number of the data link starting side apparatus 1 is stored as internal information in the data link started side apparatus 2 (step S102), and the data link starting side apparatus 1 and data link started side apparatus 2 are set in a speech communication state.

In this state, the data link starting side apparatus 1 accesses the user connection destination server 4 on the Internet 6 through the data link started side apparatus 2 to receive Web data (steps S103 and S104).

According to the MITF dial-up dormant protocol, if no communication done between the data link starting side apparatus 1 and the user connection destination server 4 for a predetermined period of time (no access is made from the data link started side apparatus 2 for the predetermined period of time), the data link starting side apparatus 1 disconnects the line between itself and the data link started side apparatus 2 (step S105). The data link starting side apparatus 1 and data link started side apparatus 2 then shift to a dormant state, and the link at the physical layer level between them is released.

When data is to be transmitted from the high-level protocol to the data link started side while the data link starting side apparatus 1 is in the "dormant state", the data link starting side apparatus 1 transmits a "reconnection request" after link establishment (MITF dial-up dormant message) to the data link started side apparatus 2. Upon reception of a reconnection response "MITF dial-up dormant message" from the data link started side apparatus 2 afterward, the data link starting side apparatus 1 shifts the communication state to an "active state". That is, the data link starting side apparatus 1 can perform "reconnection" to the data link started side apparatus 2.

In contrast to this, assume that data addressed to the data link starting side apparatus 1 is transmitted from the user connection destination server 4 to the data link started side apparatus 2. In the dormant state, however, no link at the physical layer level exists between the data link starting side apparatus 1 and the data link started side apparatus 2, and a data link connection based on the MITF dial-up dormant protocol is limited to a connection from the data link starting side, as described above. For this reason, even if data is transmitted from the Internet 6, the data link started side apparatus 2 cannot reconnect to the data link starting side apparatus 1 to transmit the data.

As described above, conventionally, in data communication based on the MITF dial-up dormant protocol, when the data link starting side and data link started side are set in the dormant state, there is no link at the physical layer level exists between them. Even if, therefore, data addressed to the data link starting side is received from the Internet, the data link started side cannot transmit the data to the data link starting side.

SUMMARY OF THE INVENTION

It is an object of the present invention to provide a data communication system which can transmit data addressed to the data link starting side from the data link started side to the data link starting side upon reception of the data from the Internet even if the data link starting side and data link started side are set in the dormant state.

In order to achieve the above object, according to the present invention, there is provided a data communication system comprising a server which provides a service through a communication network, a data link started side apparatus which holds an originating telephone number of a data link starting side apparatus, performs line control between the data link started side apparatus and the data link starting side apparatus by connecting to a circuit switched network, and performs LAN control between the data link started side apparatus and the server through the communication network, thereby relaying a packet between the data link starting side apparatus and the server, a data link starting side apparatus which is line-connected to the data link started side apparatus through the circuit switched network, disconnects the line between the data link starting side apparatus and the data link started side apparatus on the basis of an MITF dial-up dormant protocol when there is no communication between the data link starting side apparatus and the server for a predetermined period of time, and shifts to a dormant state in which a link at a physical layer level is released, and an originating server which originates data reception notification by using the originating telephone number transmitted from the data link started side apparatus as a notification destination number when a packet communication state between the data link starting side apparatus and the data link started side apparatus is in the dormant state, and the data link started side apparatus receives data addressed to the data link starting side apparatus from the server.

DESCRIPTION OF THE PREFERRED EMBODIMENT

A data communication system according to an embodiment of the present invention will be described in detail next with reference to the accompanying drawings.

Figure 1:
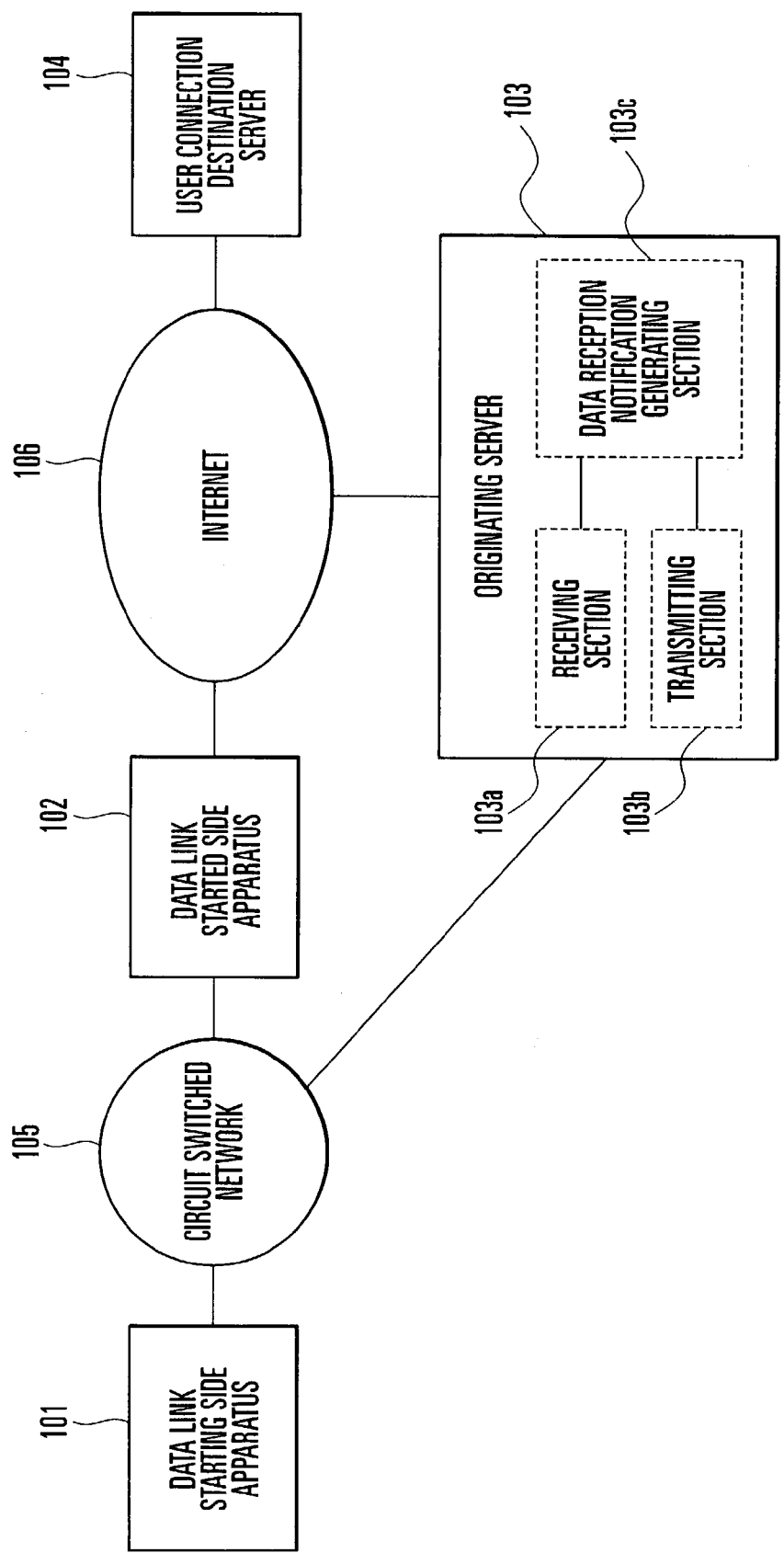
FIG. 1 is a block diagram showing the arrangement of a data communication system according to an embodiment of the present invention.

FIG. 1 shows the arrangement of the data communication system according to this embodiment. As shown in FIG. 1, this system includes an originating server 103, receiving section 103a, transmitting section 103b, and data reception notification generating section 103c.

The receiving section 103a and transmitting section 103b are connected to a circuit switched network 105 by line control, and connected to Internet 106 by LAN control. This system originates a signal to a data link starting side apparatus 101 by a procedure such as SS7 (Signaling System No. 7) using the originating telephone number of the data link starting side apparatus 101 which is contained in an origination request signal. On the basis of the origination request received from a data link started side apparatus 102, the data reception notification generating section 103c generates a data reception notification that causes the data link starting side apparatus 101 to reconnect to the data link started side apparatus 102 by using a reconnection function based on the MITF dial-up dormant protocol. Furthermore, in the data communication system of this embodiment, the data link starting side apparatus 101 has a function of making a reconnection to the data link started side apparatus 102 upon reception of a data reception notification from the originating server 103.

Figure 2:
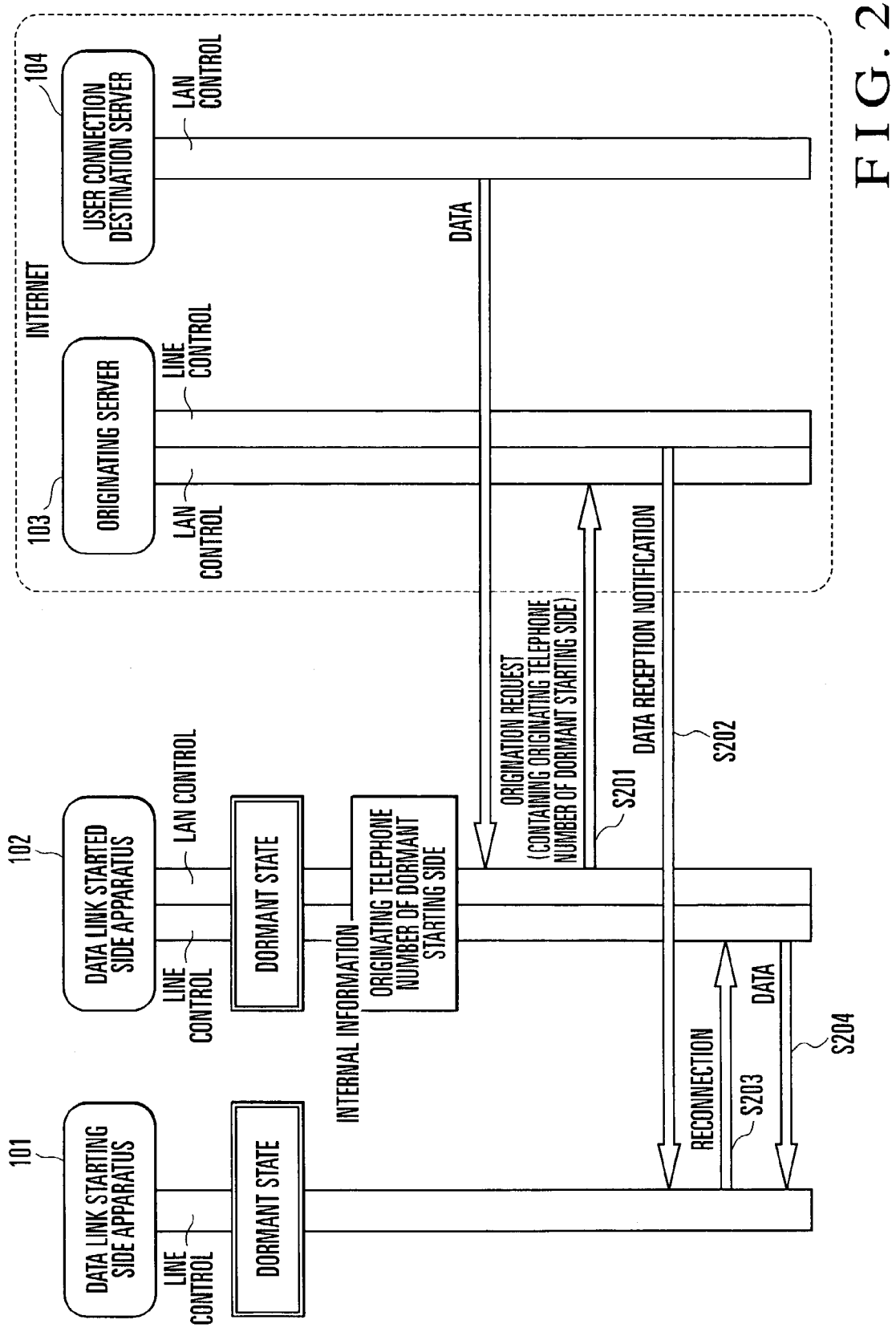
FIG. 2 is a sequence diagram showing the operation of the data communication system according to the embodiment of the present invention.
Figure 3:
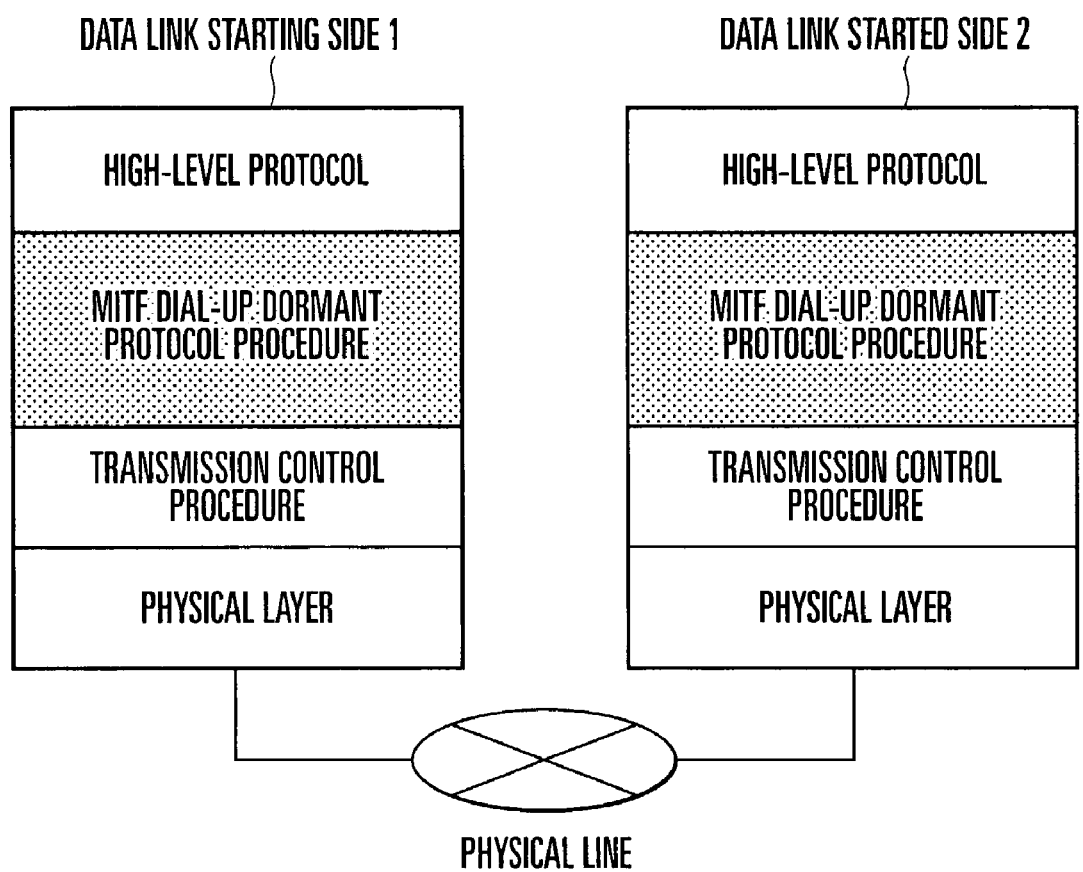
FIG. 3 is a view showing a communication environment to which the MITF dial-up dormant protocol written in ARIB STD-T78 is applied.
Figure 4:
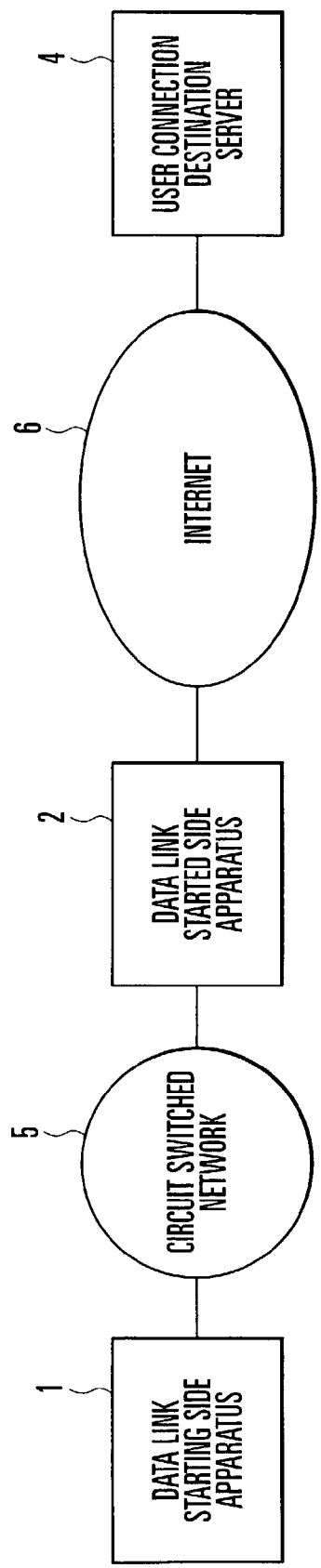
FIG. 4 is a block diagram showing the arrangement of a data communication system to which the MITF dial-up dormant protocol is applied.
Figure 5:
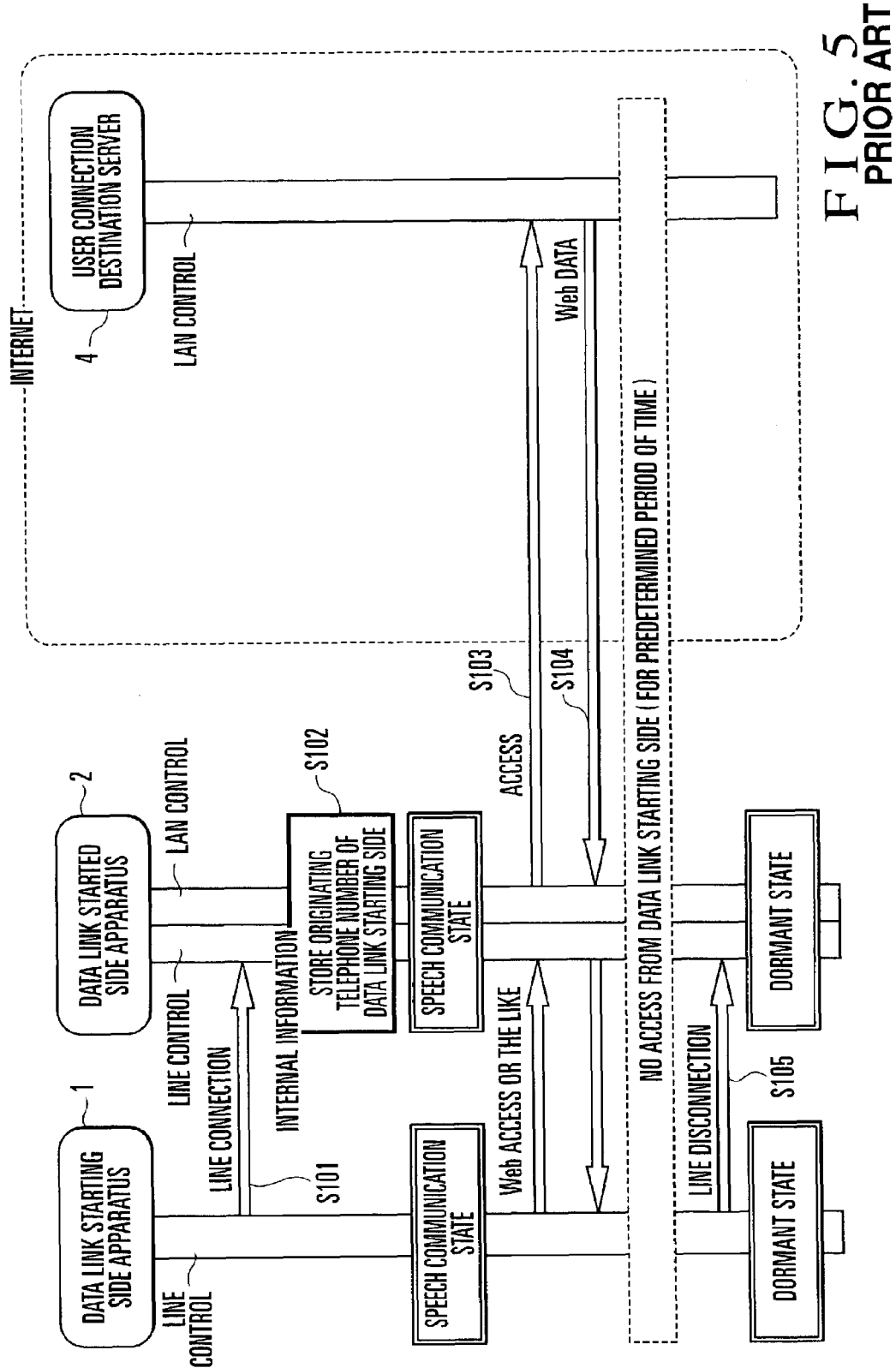
FIG. 5 is a sequence diagram showing the dormant function of the data communication system to which the MITF dial-up dormant protocol is applied.

FIG. 2 shows the operation of the data communication system of this embodiment. Assume that in the case shown in FIG. 2, the data link starting side apparatus 101 and data link started side apparatus 102 are set in the dormant state, and the data link started side apparatus 102 has received data addressed to the data link starting side apparatus 101 from a user connection destination server 104 in this state.

The data link started side apparatus 102 sets the data link starting side originating telephone number held in internal information in an origination request signal, and issues the origination request signal to the originating server 103 (step S201). Upon reception of the origination request signal, the originating server 103 originates a data reception notification to the data link starting side apparatus 101 by a procedure such as SS7 (Signaling System No. 7) using the originating telephone number of the data link starting side apparatus 101 which is contained in the origination request signal (step S202).

Upon reception of the data reception notification, the data link starting side apparatus 101 reconnects to the data link started side apparatus 102 (step S203). When the reconnection to the data link starting side apparatus 101 is completed, the data link started side apparatus 102 transmits the data which has been received from the user connection destination server 104 to the data link starting side apparatus 101 (step S204).

The data communication system of this embodiment includes the originating server 103 for receiving an origination request signal transmitted from the data link started side apparatus 102 when it receives data addressed to the data link starting side apparatus 101 from the user connection destination server 104, and then originating a data reception notification by using the originating telephone number of the data link starting side apparatus 101, which is contained in the origination request signal, as a notification destination number. Even if, therefore, the data link starting side apparatus 101 and data link started side apparatus 102 are set in the dormant state, when data addressed to the data link starting side apparatus 101 is received from the Internet 106, the data link starting side apparatus 101 can reconnect to the data link started side apparatus 102. This allows the data link started side apparatus 102 to transmit the data to the data link starting side apparatus 101. In the data communication system of this embodiment, since a reconnection is made to the data link started side apparatus 102 by using the reconnection function based on the MITF dial-up dormant protocol, even if the data link started side apparatus 102 receives data addressed to the data link starting side apparatus 101 from the user connection destination server 104, a reconnection between the data link starting side apparatus 101 and the data link started side apparatus 102 can be realized in compliance with the specifications of this protocol.

In the prior art, with only the dormant function, the user is provided with only the reconnection function of making a reconnection to the Internet from the user side. However, the application of the data communication system of this embodiment makes it also possible to perform a reconnection when data is transmitted from the Internet 106. This can expand the range of applications of the dormant function. When the fee for connection to the Internet 106 is fixed, in particular, the user often maintains a connection to the Internet 106 for a long period of time. In this case, even if the line to the Internet 106 is disconnected after a non-communication state continues for a predetermined period of time or more, a reconnection can be automatically made in real time when data is transmitted through the Internet 106. This makes it possible to expand the range of uses of services in the form of transmission of data from the Internet 106 side, e.g., chat and POP (Point Of Purchase ad).

In the data communication system of this embodiment, upon reception of some kind of data from the user connection destination server 104, the data link started side apparatus 102 issues an origination request to the originating server 103. However, the data link started side apparatus 102 may directly issue a data reception notification to the data link starting side apparatus 101.

Note that the "ARIB STD-78 MITF dial-up dormant protocol" applied to the data communication system of this embodiment uses PIAFS as a transmission control procedure. However, since a similar dormant function can be used for a public line (analog line) and ISDN, the data communication system of the present invention can be used for systems using these other lines.

As has been described above, according to the present invention, this system includes the originating server for receiving an origination request signal transmitted from a data link started side apparatus when it receives data addressed to a data link starting side apparatus from the user connection destination server, and then originating a data reception notification by using the originating telephone number of the data link starting side apparatus, which is contained in the origination request signal, as a notification destination number. Even if, therefore, the data link starting side apparatus and data link started side apparatus are set in the dormant state, when data addressed to the data link starting side apparatus is received from the Internet, the data link starting side apparatus can reconnect to the data link started side apparatus. This allows the data link started side apparatus to transmit the data to the data link starting side apparatus.

What is claimed is:

1. A data communication system comprising:
    a server which provides a service through a communication network;
    a data link starting side apparatus which makes a line connection request from an originating telephone number;
    a data link started side apparatus connecting to said data link starting side apparatus via a circuit switched network, which data link started side apparatus holds the originating telephone number of the line connection request, performs line control between said data link started side apparatus and said data link starting side apparatus by connecting said link starting side apparatus to said data link started side apparatus via a line of the circuit switched network, and performs LAN control between said data link started side apparatus and said server through the communication network, thereby relaying a packet between said link starting side apparatus and said server;
    the data link starting side apparatus which is line-connected to said data link started side apparatus through the circuit switched network, disconnects the line between said data link starting side apparatus and said data link started side apparatus on the basis of an MITF dial-up dormant protocol when there is no communication between said data link starting side apparatus and said server for a predetermined period of time, and shifts to a dormant state in which a link at a physical layer level is released; and
    an originating server which originates data reception notification to said data link starting side apparatus by using the originating telephone number transmitted from said data link started side apparatus as a notification destination number when a packet communication state between said data link starting side apparatus and said data link started side apparatus is in the dormant state, and said data link started side apparatus receives data addressed to the data link starting side apparatus from said server.

2. A system according to claim 1, wherein,
    said data link starting side apparatus reconnects to said data link started side apparatus by using a reconnection function based on the MITF dial-up dormant protocol when receiving the data reception notification from said originating server, and
    when said originating server receives said origination request, the data link starting side apparatus and the data link started side apparatus are in the dormant state according to the MITF dial-up dormant protocol and the link at the physical layer level between the data link starting side apparatus and the data link started side apparatus is released.

3. A system according to claim 1, wherein said originating server originates the data reception notification by a procedure based on SS7 (Signaling System No. 7).

4. A data communication method comprising the steps of:
    when a packet communication state between a data link starting side apparatus and a data link started side apparatus, connectable by a line of a circuit switched network, is in a dormant state, transmitting data addressed to the data link starting side apparatus from a server to the data link started side apparatus;
    transmitting, from the data link started side apparatus which has received the data, an origination request containing an originating telephone number of the data link starting side apparatus to an originating server;
    transmitting a data reception notification to said data link starting side apparatus which causes the data link starting side apparatus to initiate a reconnect to the data link started side apparatus by using a reconnection function based on the MITF dial-up dormant protocol from the originating server which has received the origination request to the data link starting side apparatus; and making a reconnection from the data link starting side apparatus, which has received the data reception notification, to the data link started side apparatus, the reconnection connecting the line of the circuit switched network between the data link starting side apparatus and the data link started side apparatus.

5. A method according to claim 4, wherein the step of transmitting the data reception notification comprises the step of originating the data reception notification by a procedure based on SS7 (Signaling System No. 7).

6. An originating server comprising:
an originating server connected to a data link starting side apparatus via circuit switched network and connected to a data link started side apparatus via the internet, said server including
reception means for receiving an origination request transmitted across the internet from the data link started side apparatus and containing an originating telephone number of the data link starting side apparatus,
wherein when receiving the origination request, the data link starting side apparatus and the data link started side apparatus are in a dormant state according to a MITF dial-up dormant protocol dormant and without a link at the physical layer level between the data link starting side apparatus and the data link started side apparatus;
data reception notification generating means for generating a data reception notification for causing the data link starting side apparatus, in a MITF dial-up dormant protocol dormant state, to reconnect to the data link started side apparatus by using a reconnection function based on the MITF dial-up dormant protocol on the basis of the origination request; and
transmission means for transmitting the data reception notification from the originating server to the data link starting side apparatus.

7. A server according to claim 6, wherein said transmission means originates the data reception notification by a procedure based on SS7 (Signaling System No. 7).

8. A server according to claim 6, wherein,
the data link started side apparatus which holds the originating telephone number of the data link starting side apparatus, performs line control between said data link started side apparatus and the line connection destination by connecting to the circuit switched network, and performs LAN control between said data link started side apparatus and a destination server through the communication network, thereby relaying a packet between the data link starting side apparatus and said destination server.

9. A server according to claim 8, wherein,
the data link starting side apparatus which is line-connected to said data link started side apparatus through the circuit switched network, disconnects the line between said data link starting side apparatus and said data link started side apparatus on the basis of the MITF dial-up dormant protocol when there is no communication between said data link starting side apparatus and said destination server for a predetermined period of time, and shifts to a dormant state in which a link at a physical layer level is released.

10. A server according to claim 8, wherein,
responding to said data link started side apparatus receiving data addressed to the data link starting side apparatus from said destination server while said data link started side apparatus is in the dormant state, said originating server originates data reception notification by using the originating telephone number transmitted from said data link started side apparatus as a notification destination number.

11. A server according to claim 8, wherein,
said originating server originates data reception notification by using the originating telephone number transmitted from said data link started side apparatus as a notification destination number when a packet communication state between said data link starting side apparatus and said data link started side apparatus is in the dormant state, and said data link started side apparatus receives data addressed to the data link starting side apparatus from said destination server.

* * * * *